(12) United States Patent
Fehrenbach et al.

(10) Patent No.: US 11,732,871 B2
(45) Date of Patent: Aug. 22, 2023

(54) SENSOR WITH A LID CONNECTED TO A HOUSING OF A STATUS DISPLAY WITH A REFLECTOR UNIT

(71) Applicant: VEGA GRIESHABER KG, Wolfach (DE)

(72) Inventors: Dominik Fehrenbach, Rottweil (DE); Jonas Schwab, Mühlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 17/715,568

(22) Filed: Apr. 7, 2022

(65) Prior Publication Data
US 2022/0349552 A1    Nov. 3, 2022

(30) Foreign Application Priority Data
Apr. 30, 2021   (DE) ...................... 10 2021 111 271.0

(51) Int. Cl.
| | |
|---|---|
| *F21V 7/00* | (2006.01) |
| *G01D 13/00* | (2006.01) |
| *F21V 17/00* | (2006.01) |
| *F21Y 115/10* | (2016.01) |
| *F21W 111/00* | (2006.01) |

(52) U.S. Cl.
CPC .......... *F21V 7/0033* (2013.01); *F21V 17/002* (2013.01); *G01D 13/00* (2013.01); *F21W 2111/00* (2013.01); *F21Y 2115/10* (2016.08)

(58) Field of Classification Search
CPC .... F21V 7/0008; F21V 7/0016; F21V 7/0025; F21V 7/0033; F21V 7/0041
See application file for complete search history.

(56) References Cited

U.S. PATENT DOCUMENTS

| 6,595,667 B1 * | 7/2003 | Obata .................... B60K 35/00 |
| | | 362/489 |
| 7,111,955 B2 * | 9/2006 | Tsai ........................ G09F 21/04 |
| | | 362/103 |
| 11,214,147 B2 * | 1/2022 | Zimmermann .......... B60Q 3/64 |

(Continued)

FOREIGN PATENT DOCUMENTS

| CN | 102588787 A | 7/2012 |
| DE | 60036073 T2 | 9/2000 |

(Continued)

OTHER PUBLICATIONS

Gpto office actions for related German application 10 2021 111 271.0 issued on Nov. 30, 2021.*

*Primary Examiner* — Matthew J. Peerce
(74) *Attorney, Agent, or Firm* — William Gray Mitchell

(57) ABSTRACT

A lid to be connected to a housing of a status display for a sensor, with a basic body comprising a covering surface and at least one side wall, wherein the basic body has at least one light-transmissive light emitting region to facilitate an illumination of desired areas of the lid that is homogeneous and space-saving, with a first reflector unit and a second reflector unit arranged opposite each other, and wherein an opening for arranging a lighting means is formed in the second reflector unit, wherein the light emitted by the lighting means is reflected to the at least one light emitting region by means of the first reflector unit and the second reflector unit.

9 Claims, 1 Drawing Sheet

(56) References Cited

U.S. PATENT DOCUMENTS

| | | |
|---|---|---|
| 2003/0184992 A1 | 10/2003 | Miyazaki |
| 2005/0281040 A1 | 12/2005 | Birman et al. |
| 2010/0165633 A1 | 7/2010 | Moolman et al. |
| 2012/0127728 A1* | 5/2012 | Chang .................. F21V 7/0041 362/296.01 |
| 2016/0096472 A1 | 4/2016 | Birman et al. |

FOREIGN PATENT DOCUMENTS

| | | |
|---|---|---|
| DE | 102010063548 A1 | 12/2010 |
| DE | 102019120683 A1 | 7/2019 |

* cited by examiner

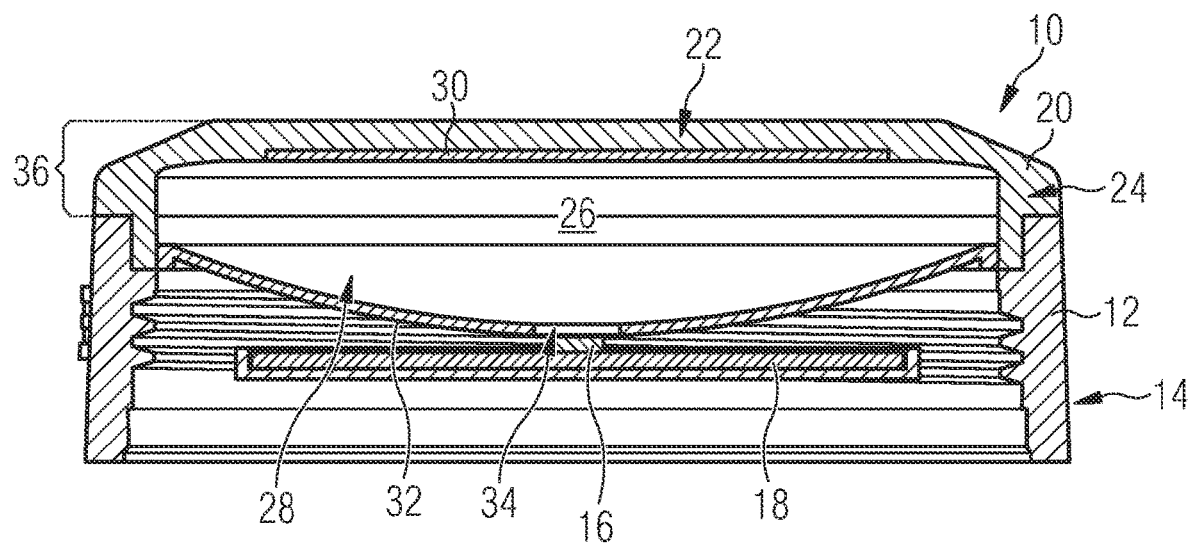

ously, a yellow light-emitting diode may represent the state "error", and a red light-emitting diode may represent the state "device failure", for example.

SENSOR WITH A LID CONNECTED TO A HOUSING OF A STATUS DISPLAY WITH A REFLECTOR UNIT

CROSS REFERENCE TO RELATED APPLICATIONS

This patent application claims priority to German Patent Application 102021111271.0, filed on Apr. 30, 2021.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention comprises a lid to be connected to a housing of a status display with a reflector unit, and a status display for a sensor.

Background of the Invention

Various sensors for the monitoring of processes are known from the prior art. For example, the sensor may be a filling level sensor for continuously monitoring a filling level of bulk material or liquid in a container, or a limit level sensor for registering a minimum or maximum limit level of bulk material in a container. The sensor may also be a pressure sensor or temperature sensor for detecting the pressure or temperature in a container or pipe. The sensor may also be a flow sensor for detecting the flow of a medium in a tube, a conveyor belt or the like. The sensor is capable of carrying out any type of measurement and display the status thereof by means of a light source.

Generally, such sensors are provided with a status display. In this case, the sensors or status displays usually comprise a housing, at least one electronic component disposed in the housing, for detecting a state or status of the sensor, and at least one lighting means for visually displaying the status, wherein the status can be read out from outside the sensor via a display unit. For example, the status may include the fact that a measurement signal exceeds or drops below a limit value, that the measuring device as such is operational, that an admissible temperature is exceeded or underrun.

In order for a user to be able to determine the status of the sensor as quickly as possible, the status display has at least one lighting means that is suitably configured for visually displaying the state. For example, one or several light-emitting diodes (LEDs), which make the status of the sensor visible towards the outside in the manner of a traffic light circuit with three different states, for example, may be provided as lighting means. In such a traffic light circuit, a green light-emitting diode may represent the state "device operational", a yellow light-emitting diode may represent the state "error", and a red light-emitting diode may represent the state "device failure", for example.

In this case, so-called pucks are often used to reflect the light from the lighting means towards the outside as well as possible. The pucks are complete units consisting of a lighting means (e.g. LEDs) and a light-refractive and light-distributing optical unit, which distributes the light across the outer surface of the puck as homogeneously as possible.

The fact that such pucks require a lot of construction space and that a part of the light output is lost already within the pucks, is a drawback. Particularly in light of the fact that only certain areas of a status display are supposed to be illuminated—but the light from the puck is homogenously emitted in all directions in space—it is desirable to attain a good illumination of the status display even without a puck.

Therefore, it is the underlying object of the invention to provide a lid to be connected to a housing of a status display as well as a status display for a sensor, which facilitate an illumination of desired areas of the lid that is as homogeneous and space-saving as possible. In particular, the use of a puck is to be rendered obsolete.

BRIEF SUMMARY OF THE INVENTION

In a preferred embodiment, a lid to be connected to a housing (12) of a status display (14) for a sensor, with a basic body (20) comprising a covering surface (22) and at least one side wall (24), wherein the basic body (20) has at least one light-transmissive light emitting region (36), characterized in that the lid (10) has a first reflector unit (30) and a second reflector unit (32) arranged opposite each other, and wherein an opening (34) for arranging a lighting means (16) is formed in the second reflector unit (32), wherein the light emitted by the lighting means (16) is reflected to the at least one light emitting region (36) by means of the first reflector unit (30) and the second reflector unit (32).

In another preferred embodiment, a lid as described herein, characterized in that at least a part of a side wall (24) and/or at least a part of the covering surface (22) of the basic body (20) form a light emitting region (36).

In another preferred embodiment, a lid as described herein, characterized in that the first reflector unit (30) is disposed on the covering surface (22).

In another preferred embodiment, a lid as described herein, characterized in that the reflector unit (30) has a planar configuration, or that the first reflector unit (30) has a convex configuration.

In another preferred embodiment, a lid as described herein, characterized in that the first reflector unit (30) is opaque.

In another preferred embodiment, a lid as described herein, characterized in that the second reflector unit (32) extends across the entire open side (28) of the basic body (20).

In another preferred embodiment, a lid as described herein, characterized in that the second reflector unit (32) is a concave mirror.

In another preferred embodiment, a lid as described herein, characterized in that the second reflector unit (32) is detachably fastened to the basic body (20).

In another preferred embodiment, a lid as described herein, characterized in that the basic body (20) is at least partially transparent and/or translucent.

In another preferred embodiment, a status display for a sensor, with a housing (12) and a light source (16) for displaying a status disposed in the housing (12), characterized in that the housing (12) is closed by a lid (10) as described herein, wherein the light of the lighting means (16) is reflected via the reflector unit (30, 32) towards the outside through the at least one light emitting region (36).

BRIEF DESCRIPTION OF THE DRAWINGS

FIG. 1 is a line drawing evidencing a lid according to the invention in connection with a housing of a sensor in a section.

DETAILED DESCRIPTION OF THE INVENTION

A lid according to the invention, which is to be connected to a housing of a status display for a sensor, has a basic body. The basic body comprises a covering surface and at least one side wall. In particular, this is a circumferentially extending side wall, and the lid, in a top view, has a circular configuration. The side of the basic body opposite the covering surface is open. Seen in cross-section, the basic body has a U-shaped configuration or, in other words, the basic body has a cup-shaped configuration. The lid surrounds an inner space which, viewed in cross-section, is enclosed from three sides.

The basic body has at least one light emitting region. In the light emitting region, the basic body is light-transmissive, i.e. transparent or translucent to light with a wavelength in the visible spectrum. For this purpose, the basic body may be made from a transparent or translucent material either in its entirety or in some portions. In this case, transparent is supposed to mean that the light in the visible spectrum shines through the light emitting region largely without being absorbed. Translucent light emitting regions may be realized by means of matte materials or thin walls, for example. Here, the light in the visible spectrum is partially absorbed.

The lid has a first reflector unit and a second reflector unit disposed opposite each other. The respective reflective surfaces of the first and second reflector units face towards each other. An opening for arranging a lighting means is formed in the second reflector unit. Accordingly, the first reflector unit is arranged opposite the opening for the lighting means. The lighting means can be arranged so as to protrude through the opening or directly underneath the opening, so that the light emitted by the lighting means gets into the inner space of the lid through the opening. The light emitted by the lighting means is reflected to the at least one light emitting region by means of the first reflector unit and the second reflector unit. The first reflector unit and the second reflector unit may be configured integrally and, in particular, as two separate elements. Moreover, it is also possible that the lid has further reflector units.

As will be described in more detail below, the arrangement of the first reflector unit and the second reflector unit on the lid permits the light of the lighting means to be directly—i.e., in particular, without being previously coupled out by means of an optical system of a puck—and homogeneously distributed across the at least one light emitting region. Particularly if the lid is connected to a housing of a status display, the status can be read even at very bright light conditions due to the intensity caused by the first reflector unit and the second reflector unit. Further, due to the opposing arrangement of the first reflector unit and the second reflector unit, the light is additionally concentrated or focused on the desired light emitting region and thus, the luminosity in these areas is increased. On the whole, the lid can be made very small. Compared to the arrangement of a puck, the reflector units only require little construction space. Moreover, the lid according to the invention is designed in such a way that, in connection with sensors, it can be used with different lighting means and can therefore be used in a particularly flexible manner.

In particular on the at least one side wall, the lid has a connecting portion for connecting the lid to the housing of the sensor. Various types of connection are conceivable in this case. In particular, the lid has a threaded portion for screwing it to a housing of the sensor.

In particular, the at least one light emitting region is formed in at least a part of a side wall and/or at least a part of the covering surface of the basic body. In particular, the light emitting region extends circumferentially around the basic body, so that the status of a sensor is recognizable from as many directions as possible.

In a practical embodiment of the lid according to the invention, the first reflector unit is disposed on the covering surface of the lid. In this case, the reflective surface of the first reflector unit is directed towards the inner space. In particular, the first reflector unit extends only across a part of the covering surface.

In particular, the reflector unit has a planar configuration. Alternatively, the first reflector unit may also have a convex configuration. In this case, the first reflector unit may be realized in the form of a plate, a disk or a film, or in the form of a coating on the inside of the covering surface of the basic body, or also on the outside of the covering surface of the basic body. Integrating the first reflector unit into the basic body is also conceivable.

In particular, the first reflector unit is opaque to light. Light beams incident upon the first reflector unit are all reflected, which results in losses being minor. However, the light cannot escape to the outside in the part of the basic body in which the first reflector unit is arranged. Viewed from the outside, the lighting means is concealed in this area, and the basic body has no light emitting region here.

In another practical embodiment of the lid according to the invention, the second reflector unit extends across the entire open side of the lid opposite the covering surface. The second reflector unit closes off the inner space of the lid in the downward direction. Light can move from below in the direction of the inner space only via the opening. The reflective surface of the second reflector unit is directed towards the first reflector unit and the inner space of the lid. The second reflector unit may also be configured as a reflective metal sheet, film or coating.

In particular, the second reflector unit is configured as a concave mirror (also referred to as curved mirror). In particular, it is a parabolic mirror or spherical mirror.

Particularly in connection with an opposite planar or convex first reflector unit, a particularly homogeneous and luminous illumination of the at least one light emitting region can thus be attained. Light emitted at an angle by the lighting means is first incident upon the first reflector unit, from which the light is reflected—in the case of a planar first reflector unit in accordance with the principle angle of incidence equals the angle of reflection, and outwards in the case of a convex first reflector unit. It is then incident upon the concave mirror at an angle. In this case, the concave mirror is designed such that the beams reflected by the concave mirror are reflected towards the at least one light emitting region, and particularly towards the side wall. In particular, the focal point is located far outside the lid. The first reflector unit and the second reflector unit are arranged as closely to each other as possible. The radiation emitted by the lighting means is reflected with very little loss onto the areas to be illuminated. On the whole, an efficient illumination of the light emitting region is thus attained. As was already mentioned above, light is primarily reflected towards the circumferentially extending side wall. The status of a sensor is then visible all around the lid.

In another practical embodiment, the second reflector unit is detachably fastened to the basic body. Depending on the type or positioning of the lighting means, and depending on the arrangement of the light emitting region, the second reflector unit may be replaced as required. Alternatively, the second reflector unit is solidly connected to the basic body.

In particular, the basic body is partially or completely transparent or translucent. In this case, the basic body may consist of a material that is transparent or translucent. However, it is also conceivable that the basic body consists of several materials, wherein a material is opaque and another transparent or translucent. This may be realized by means of a 2K injection molding method, for example.

If the first reflector unit is disposed on the covering surface, no light can exit from the basic body in this area, however. Accordingly, only those areas of the basic body are light emitting regions that are not concealed by the first reflector unit. As was already described above, the light emitting regions are, in particular, the at least one side wall and a non-concealed part of the covering surface.

The invention also relates to a status display for a sensor. The status display has a housing and a light source for displaying the status, which is disposed in the housing. The housing is closed by a lid as it is described above, wherein the light of the lighting means is reflected via the first reflector unit and the second reflector unit towards the outside through the at least one light emitting region.

The invention also relates to a sensor with a status display as described above. The sensor may be, in particular, a filling level sensor, a limit level sensor, a pressure sensor, a flow sensor or a temperature sensor.

With regard to the advantages of a status display or of a sensor, reference is made to the above description.

DETAILED DESCRIPTION OF THE FIGURES

FIG. 1 shows a lid 10 which is connected to a housing 12 of a status display 14 for a sensor. Here, the housing 12 of the status display 14 is shown only with an upper portion. The status display 14 has a lighting means 16 (an LED) and associated electronics 18 for controlling the lighting means 16. The lid 10 serves for scattering the light of the lighting means 18 towards the outside in as homogeneous, efficient and widely visible a manner as possible.

The lid 10 has a basic body 20 with a covering surface 22 and a circumferentially extending side wall 24. The covering surface 22 and the side wall 24 surround an inner space 26. In addition, the basic body 20 has an open side 28, which is opposite the covering surface 22.

The lid 10 also has a first reflector unit 30 and a second reflector unit 32. The first reflector unit 30 and the second reflector unit 32 are disposed opposite each other.

Here, the first reflector unit 30 is configured as a planar mirror, with the reflective side facing towards the second reflector unit 32. Here, the first reflector unit 30 is arranged as a separate element on the inside of the covering surface 22 of the basic body 20. It is also conceivable that the first reflector unit is configured as a convex mirror.

Here, the second reflector unit 32 is configured as a concave mirror, specifically as a parabolic mirror. The reflective surface faces towards the first reflector unit 30. An opening 34 for arranging the lighting means 16 is formed in the second reflector unit 32.

In the present case, the basic body 20 consists of a light-transmissive material. The circumferentially extending side wall 24 and the part of the covering surface 22 that is not concealed by the first reflector unit 30 form a light emitting region 36 via which light of the lighting means 16 gets outside.

Radiation emitted by the lighting means 16 at an angle is reflected by the first reflector unit 30 under the corresponding angle of reflection. This beam, which is incident upon the concave mirror 32 at an angle, is then reflected further outwards in the direction of the light emitting region 36. All beams emitted at an angle by the lighting means 16 are reflected towards the light emitting region 36. On the whole, the opposing arrangement of the first reflector unit 30 and the second reflector unit 32 results in a bright and homogeneous illumination of the entire light emitting region 36.

LIST OF REFERENCE NUMBERS

10 Lid
12 Housing
14 Status display
16 Lighting means
18 Electronics
20 Basic body
22 Covering surface
24 Side wall
26 Inner space
28 Open side
30 First reflector unit
32 Second reflector unit
34 Opening
36 Light emitting region Unless indicated otherwise, identical reference numbers in the FIGURES identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

It must be noted that the features cited individually in the claims can be combined with each other in any technologically meaningful manner (also across the boundaries of categories, such as method and device) and represent other embodiments of the invention. The description, in particular in connection with the FIGURES, additionally characterizes and specifies the invention.

It may also be noted that a conjunction "and/or" used hereinafter, which is situated between two features and links them to each other, should always be interpreted such that, in a first embodiment of the subject matter according to the invention, only the first feature may be provided, in a second embodiment, only the second feature may be provided, and in a third embodiment, both the first and the second feature may be provided.

We claim:

1. A sensor, which is a filling level sensor, a limit level sensor, a pressure sensor, a flow sensor or a temperature sensor, wherein the sensor comprises a status display, with a housing and a light source for displaying a status disposed in the housing, wherein the housing is closed by a lid with a basic body comprising a covering surface and at least one side wall, wherein the basic body has at least one light-transmissive light emitting region, wherein the lid has a first reflector unit and a second reflector unit arranged opposite each other, and wherein an opening for arranging a lighting means is formed in the second reflector unit, wherein the light emitted by the lighting means is reflected via the reflector toward the outside through the at least one light emitting region.

2. The sensor of claim 1, wherein at least a part of a side wall and/or at least a part of the covering surface of the basic body form a light emitting region.

3. The sensor of claim 1, wherein the first reflector unit is disposed on the covering surface.

4. The sensor of claim 1, wherein the reflector unit has a planar configuration, or that the first reflector unit has a convex configuration.

5. The sensor of claim 1, wherein the first reflector unit is opaque.

6. The sensor of claim 1, wherein the second reflector unit is a concave mirror.

7. The sensor of claim 1, wherein the second reflector unit is detachably fastened to the basic body.

8. The sensor of claim 1, wherein the basic body is at least partially transparent and/or translucent.

9. A lid for a sensor, which is a filling level sensor, a limit level sensor, a pressure sensor, a flow sensor, or a temperature sensor, wherein the sensor comprises a status display, with a housing and a light source for displaying a status disposed in the housing, wherein the housing is closed by the lid and the lid comprises a basic body comprising a covering surface and at least one side wall, wherein the basic body has at least one light-transmissive light emitting region, wherein the lid has a first reflector unit and a second reflector unit arranged opposite each other and wherein an opening for arranging a lighting means is formed in the second reflector unit, wherein the first reflector unit is arranged opposite the opening for the lighting means and the light emitted by the lighting means is reflected to the at least one light emitting region by means of the first reflector unit and the second reflector unit, wherein at least a part of a side wall form a light emitting region.

* * * * *